United States Patent
Okamura et al.

(10) Patent No.: US 9,499,704 B2
(45) Date of Patent: Nov. 22, 2016

(54) INK, INK CARTRIDGE, AND INK JET RECORDING METHOD

(71) Applicant: CANON KABUSHIKI KAISHA, Tokyo (JP)

(72) Inventors: Daiji Okamura, Tokyo (JP); Kousuke Yamasaki, Kawasaki (JP); Kenichi Shiiba, Warabi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/559,825

(22) Filed: Dec. 3, 2014

(65) Prior Publication Data

US 2015/0159031 A1    Jun. 11, 2015

(30) Foreign Application Priority Data

Dec. 5, 2013  (JP) ................. 2013-252553

(51) Int. Cl.
  *B41J 2/21*    (2006.01)
  *C09D 11/102*  (2014.01)
  *C09D 11/30*   (2014.01)

(52) U.S. Cl.
  CPC ........... *C09D 11/102* (2013.01); *B41J 2/2107* (2013.01); *C09D 11/30* (2013.01)

(58) Field of Classification Search
  CPC ........... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
  USPC .................................................. 347/95–105
  See application file for complete search history.

(56) References Cited

U.S. PATENT DOCUMENTS

| | | | |
|---|---|---|---|
| 6,533,408 B1 | 3/2003 | Erdtmann et al. | |
| 2012/0219769 A1* | 8/2012 | Nagahama | C09D 11/32 428/195.1 |
| 2012/0249663 A1* | 10/2012 | Okumura | C09D 11/322 347/20 |
| 2012/0306976 A1* | 12/2012 | Kitagawa | C09D 11/326 347/100 |

FOREIGN PATENT DOCUMENTS

| | | |
|---|---|---|
| CN | 1142518 A | 2/1997 |
| CN | 102656239 A | 9/2012 |
| CN | 102732089 A | 10/2012 |
| EP | 1792956 A1 | 6/2007 |
| JP | H09-291242 A | 11/1997 |
| JP | 2005-515289 A | 5/2005 |

* cited by examiner

*Primary Examiner* — Manish S Shah
(74) *Attorney, Agent, or Firm* — Canon U.S.A. Inc., IP Division

(57) ABSTRACT

An aqueous ink for ink jet contains a urethane resin. The urethane resin has a unit derived from a polyether polyol and a unit containing an acidic group. The acid value of the urethane resin is 40 to 140 mg KOH/g. The molar ratio of urethane bonds/urea bonds is 80.0/20.0 or more. Some of the acidic groups in the urethane resin are neutralized with particular neutralizing agents.

15 Claims, No Drawings

INK, INK CARTRIDGE, AND INK JET RECORDING METHOD

BACKGROUND OF THE INVENTION

1. Field of the Invention

The present invention relates to an ink, an ink cartridge, and an ink jet recording method.

2. Description of the Related Art

Ink jet recording methods using plain paper as a record medium have also been utilized in printing of business text and other documents that include characters, tables, and figures, at a rapidly increasing frequency in such applications. In such applications an ink in which pigment is used as a coloring material (pigment ink) is often used because high levels of color development and fastness of images (resistance to light, ozone gas, water, etc.) are required.

A factor in the superior color development of images recorded with pigment ink compared to that with an ink in which dye is used as a coloring material is a large amount of coloring material on the surface of the record medium. This is because dye permeates deep into a record medium, whereas pigment quickly aggregates because of the evaporation of liquid components during or after the application of the ink to a record medium. Pigment ink, however, causes a low highlighter resistance of images because the pigment as a coloring material often remains on the surface of a record medium.

It has been attempted to add urethane resin to ink to improve the characteristics, for example, of images recorded with pigment ink (refer to PCT Japanese Translation Patent Publication No. 2005-515289 and Japanese Patent Laid-Open No. 9-291242). The ink described in PCT Japanese Translation Patent Publication No. 2005-515289 contains a urethane resin having an acidic group. The ink described in Japanese Patent Laid-Open No. 9-291242 contains a urethane resin that has a specified molar ratio of urethane bonds/urea bonds. This publication also discloses a urethane resin that has no urea bonds.

After studying these inks containing urethane resin afresh, the inventors found that the use of urethane resin admittedly improved the highlighter resistance of images, but not to an extent where the level of resistance demanded in recent years could be achieved.

When a known ink containing urethane resin is ejected through an ink jet recording head, furthermore, the ejection stability and ejection accuracy of the ink are low and need to be improved. The urethane resin described in PCT Japanese Translation Patent Publication No. 2005-515289 was found to give the ink only insufficient ejection stability because of its low acid value of approximately 30 mg KOH/g.

Japanese Patent Laid-Open No. 9-291242 also discloses that the molar ratio of urethane bonds/urea bonds of the urethane resin is in the range of 80.0/20.0 to 50.0/50.0. Ejecting an ink containing such a urethane resin through a recording head results in the urethane resin adhering to the surface of the recording head where the head has an ejection orifice (ejection orifice surface). The urethane resin adhering to the ejection orifice surface catches the subsequent ink droplets, making the ink droplets deviate from the intended direction of ejection. This phenomenon is hereinafter referred to as "irregular ejection."

Irregular ejection occurs whatever the mode of ejection of the ink. The deviation of ink droplets from the intended direction of ejection is minor immediately after the ink is ejected, but becomes significant by the time when the record medium is reached. Once irregular ejection occurs, ink dots no longer adhere to the intended positions on the record medium, leaving non-recorded areas in streaks on the image and seriously affecting the quality of the image.

SUMMARY OF THE INVENTION

The inventors found through research that the use of a urethane resin having a lower proportion of urea bonds tends to prevent the ink from undergoing irregular ejection. However, the inventors also realized that even with such a urethane resin, irregular ejection starts to be observed after some time from the preparation of the ink, although it is unlikely to occur immediately after the ink is prepared.

These problems are solved by an aspect of the invention that follows. An ink according to an aspect of the invention is an aqueous ink for ink jet. The aqueous ink contains a urethane resin. The urethane resin has a unit derived from a polyether polyol and a unit containing an acidic group. The acid value of the urethane resin is 40 mg KOH/g or more and 140 mg KOH/g or less. The molar ratio of the proportion (% by mole) of a urethane bond in the urethane resin to the proportion (% by mole) of a urea bond is 80.0/20.0 or more. The acidic groups in the urethane resin are neutralized with an alkali metal ion and at least one ammonium type ion selected from ammonium ion and an organic ammonium ion, with the neutralization ratio of all acidic groups in the urethane resin being 80% or more and the neutralization ratio with the ammonium type ion being 1% or more and less than 45%.

Further features of the present invention will become apparent from the following description of exemplary embodiments.

DESCRIPTION OF THE EMBODIMENTS

The following describes some aspects of the invention in detail by referring to preferred embodiments. An aqueous ink for ink jet may be simply referred to as "ink." The values of the characteristics mentioned herein are values at normal temperature (25° C.) unless otherwise specified.

Urethane resin is, in a broad sense, a resin synthesized using a (poly)isocyanate. A urethane resin commonly used in aqueous inks for ink jet is synthesized using at least a polyisocyanate and a reaction partner (a polyol or a polyamine), optionally with a cross-linking agent or a chain extender. A urethane resin synthesized using such components has two major segments, a hard segment and a soft segment. The hard segment is made up of units derived from components such as polyisocyanate, a short-chain polyol (e.g., an acidic-group-containing diol) or a polyamine, and a chain extender, mainly contributing to the strength of the urethane resin. The soft segment is made up of units derived from components such as a long-chain polyol, mainly contributing to the flexibility of the resin. Film made from urethane resin (hereinafter sometimes referred to as urethane resin film) combines strength and flexibility and exhibits high elasticity because of the micro phase separation structure of these hard and soft segments. Such characteristics of urethane resin film are closely associated with highlighter resistance of an image.

The inventors first conducted studies to identify a structure of urethane resin that would give the recorded image improved highlighter resistance and at the same time provide the ink with satisfactory ejection stability. As a result, it was found that these two characteristics are obtained when the urethane resin has a unit derived from a polyether polyol and a unit containing an acidic group and has an acid value of 40 mg KOH/g or more and 140 mg KOH/g or less. Film made from a urethane resin having a polyether polyol offers a good balance between strength and flexibility in particular, and the not-too-high acid value, 140 mg KOH/g or less, should account for the improved highlighter resistance. Furthermore, the not-too-low acid value, 40 mg KOH/g or more, and the polyol's nature of being an ether together give the urethane resin an adequate hydrophilicity, which should account for the enhanced ejection stability of the ink.

However, the use of such a urethane resin resulted in the occurrence of irregular ejection and reduced ejection accuracy of the ink. The inventors conducted research to identify the cause and found that urea bonds in the urethane resin were involved. A urea bond has two N—H bonds and tends to be highly adhesive to other materials because of these N—H bonds. This should be the reason why the urethane resin was adhesive to the ejection orifice surface of a recording head, causing irregular ejection and affecting the ejection accuracy. This means that decreasing urea bonds improves the ejection accuracy. The inventors' research revealed that making the molar ratio of the proportion of urethane bonds in the urethane resin to the proportion of urea bonds 80.0/20.0 or more improves the ejection accuracy of the ink.

It was, however, found that even with such a urethane resin, irregular ejection starts to be observed after some time from the preparation of the ink, although it is unlikely to occur immediately after the ink is prepared. The inventors conducted research to identify the cause. An ink containing urethane resin experiences the decomposition of the urethane resin after some time from being prepared. In particular, a urethane resin having a polyether polyol produces an alcohol component when decomposed, and this component reduces the pH of the ink when oxidized. The reduced pH of the ink leads to a reduced net neutralization ratio of the urethane resin and therefore to an accordingly reduced hydrophilicity of the urethane resin, enhancing the interactions of the urethane resin with the materials of which the ejection orifice surface is made. This should be the reason why the urethane resin was adhesive to the ejection orifice surface, causing irregular ejection and affecting the ejection accuracy. In particular, the use of a water-repellent material or any other hydrophobic material in the ejection orifice surface makes the urethane resin more adhesive to the ejection orifice surface.

Thus the inventors conducted studies on controlling the drop of the ejection accuracy over time by preventing the pH of the ink from decreasing. Returning to the fact that the decrease in the pH of the ink was caused by the decomposition of the unit of the urethane resin derived from a polyether polyol in the first place, the inventors searched for a way to control this decomposition.

For example, it is known that a phenol type antioxidant is effective in controlling the decomposition of ether bonds. The inventors also used this type of antioxidant and checked its performance. Admittedly the antioxidant tended to limit the decomposition of ether bonds and thus reduced the decrease in the pH of the ink, but not to an extent that the drop of ejection accuracy could be prevented. The use of a pH buffer was also studied, but found not to be very practical because when used in an amount sufficient to prevent the drop of ejection accuracy, a pH buffer tends to affect the other ink jet characteristics.

The inventors tried to find another way to control the decrease in the pH of the ink, and realized that this can be done through the neutralization of the acidic groups in the urethane resin, which has a unit derived from a polyether polyol and a unit containing an acidic group. That is, the acidic groups in the urethane resin are neutralized with an alkali metal ion in combination with at least one ammonium type ion selected from the ammonium ion and an organic ammonium ion, with the neutralization ratio of all acidic groups in the urethane resin being 80% or more and the neutralization ratio with the ammonium type ion being 1% or more and less than 45%. This limits the drop of the ejection accuracy over time without greatly affecting the other ink jet characteristics.

The inventors presume that the reason for such an advantage should be as follows. As mentioned above, a urethane resin having a polyether polyol produces an alcohol component when decomposed, and this alcohol component produces a proton and reduces the pH of the ink when oxidized. When the acidic groups in the urethane resin are neutralized with an alkali metal ion and an ammonium type ion, the situation should be as follows. That is, the urethane resin exists stably in the ink because the acidic groups in the ink are neutralized with the alkali metal ion. In such a situation, the ink jet characteristics, such as ejection stability, are not affected. In addition to this, the ammonium type ion appears to limit the decrease in the pH of the ink by efficiently trapping and cationizing the proton resulting from the decomposition of the urethane resin when existing near the urethane resin.

When the alkali metal ion and the ammonium type ion are not used as neutralizing agents for the acidic groups in the urethane resin, however, the advantage of the invention is not obtained. For example, when the alkali metal ion is derived from a pH adjusting agent or any similar material and simply exists in the ink, only a very small amount of the alkali metal ion is near the urethane resin. The urethane resin is therefore likely to be instable in the ink, and thus ejection stability is not obtained. Likewise, when the ammonium type ion is derived from a pH adjusting agent or any similar material and simply exists in the ink, only a very small amount of the ammonium type ion is near the urethane resin, which means that the proton resulting from the decomposition of the urethane resin cannot be trapped. As a result, the decrease in the pH of the ink cannot be controlled, and the drop of the ejection accuracy over time cannot be controlled either.

Through studies of inks containing a urethane resin in which a polyether polyol was used, the inventors confirmed the following facts. First, urethane resins having acidic groups neutralized only with an alkali metal ion were prepared using alkali metal hydroxides, such as potassium hydroxide, and inks containing these resins were produced. Then urethane resins having acidic groups neutralized with an alkali metal ion and an ammonium type ion were prepared using alkali metal hydroxides, such as potassium hydroxide, and ammonium type compounds, such as triethanolamine, and inks containing these resins were produced.

Then these inks were subjected to a storage study under high-temperature conditions simulating the duration of use of the inks, and the pH of each ink was measured before and after this storage study. The inks that contained a urethane resin having acidic groups neutralized only with an alkali metal ion had a considerably decreased pH and reduced ejection accuracy after the storage study (over time), although their ejection accuracy was good before the storage study. In contrast, the inks that contained a urethane resin having acidic groups neutralized with both an alkali metal ion and an ammonium type ion had little decrease in pH and maintained good ejection accuracy even after the storage study (over time).

In light of these facts, the inventors conducted additional studies to explore the relationship between the neutralization ratio of the acidic groups in the urethane resin with an alkali metal ion and an ammonium type ion and the decrease in the pH of the ink. Through these studies, it was found that satisfying the following is sufficient: the neutralization ratio of all acidic groups in the urethane resin is 80% or more; and the neutralization ratio with the ammonium type ion is 1% or more and less than 45%. This leads to a controlled decrease in the pH of the ink and good ejection accuracy over time without affecting the other ink jet characteristics.

Ink

The following describes in detail the individual components of an aqueous ink for ink jet according to an embodiment of the invention.

Urethane Resin

A urethane resin contained in an ink according to an embodiment of the invention has a unit derived from a polyether polyol and a unit containing an acidic group. The acid value of the urethane resin is 40 mg KOH/g or more and 140 mg KOH/g or less, and the molar ratio of the proportion (% by mole) of urethane bonds in the urethane resin to the proportion (% by mole) of urea bonds is 80.0/20.0 or more. The acidic groups in the urethane resin are neutralized with an alkali metal ion and an ammonium type ion, with the neutralization ratio of all acidic groups in the urethane resin being 80% or more and the neutralization ratio with the ammonium type ion being 1% or more and less than 45%.

The urethane resin content (% by mass) in the ink can be 0.1% by mass or more and 10.0% by mass or less, preferably 0.5% by mass or more and 3.0% by mass or less, based on the total mass of the ink. Making the urethane resin content less than 0.1% by mass can cause the highlighter resistance not to be sufficiently high. Making the urethane resin content more than 10.0% by mass can cause the ink jet characteristics not to be sufficiently good because in such a case the viscosity of the ink would often be high.

Constituent Units

A urethane resin used in an ink according to an embodiment of the invention has a unit derived from a polyether polyol and a unit containing an acidic group. As mentioned above, a urethane resin commonly used in aqueous inks for ink jet is synthesized using at least a polyisocyanate and a reaction partner (a polyol or a polyamine), optionally with a cross-linking agent or a chain extender. A "unit" in a urethane resin, as mentioned herein, refers to a repeating unit derived from a single monomer. The following describes the individual monomers that form constituent units of the urethane resin through synthesis.

Polyisocyanate

Examples of polyisocyanates include aliphatic polyisocyanates and aromatic polyisocyanates.

Examples of aliphatic polyisocyanates include the following: polyisocyanates that have a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate; and polyisocyanates that have a ring structure, such as isophorone diisocyanate, hydrogenated xylylene diisocyanate, 4,4'-dicyclohexylmethane diisocyanate, 1,4-cyclohexane diisocyanate, methyl cyclohexylene diisocyanate, and 1,3-bis(isocyanate methyl)cyclohexane.

Examples of aromatic polyisocyanates include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and $\alpha,\alpha,\alpha,\alpha$-tetramethylxylylene diisocyanate.

A single polyisocyanate can be used alone, and it is also possible to use two or more polyisocyanates if necessary. In particular, it is preferred to use at least an aliphatic polyisocyanate.

Polyol or Polyamine

Examples of components that form a unit that reacts with the polyisocyanate to form the urethane resin include polyols and polyamines. A single polyol or polyamine can be used alone, and it is also possible to use two or more polyols and/or polyamines if necessary. A urethane resin used in an ink according to an embodiment of the invention has at least a unit derived from a polyether polyol and a unit containing an acidic group, e.g., a unit derived from an acidic-group-containing diol.

Examples of polyols include: long-chain polyols such as polyether polyols, polyester polyols, and polycarbonate polyols; and short-chain polyols such as diols containing an acidic group.

Examples of polyether polyols include alkylene oxide-polyol addition polymers and glycols such as (poly)alkylene glycols. Examples of alkylene oxides include ethylene oxide, propylene oxide, butylene oxide, and $\alpha$-olefin oxide. Examples of polyols that form an addition polymer with an alkylene oxide include the following: diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenyl propane, 4,4-dihydroxyphenyl methane, hydrogenated bisphenol A, and dimethylolurea and its derivatives; and triols such as glycerin, trimethylolpropane, 1,2,5-hexanetriol, 1,2,6-hexanetriol, pentaerythritol, trimethylolmelamine and its derivatives, and polyoxypropylenetriol. Examples of glycols include the following: (poly)alkylene glycols such as hexamethylene glycol, tetramethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol, and neopentylglycol; and ethylene glycol-propylene glycol copolymers.

In particular, polyethylene glycol, poly(1,2-butylene glycol), poly(1,3-butylene glycol), are polypropylene glycol are preferred, and polypropylene glycol is more preferred. The use of these polyether polyols enhances the highlighter resistance of images and the ejection stability of the ink by ensuring a good balance between the strength and flexibility of urethane resin film and increasing the hydrophilicity of the urethane resin. The proportion (% by mole) of a unit derived from such a preferred polyether polyol in the total amount of the polyether polyol-derived unit of the urethane resin can be 80.0% or more, and can be 100.0% or less.

Examples of polyester polyols include acid esters. Examples of acid components of acid esters include the following: aromatic dicarboxylic acids such as phthalic acid, naphthalene dicarboxylic acid, biphenyl dicarboxylic acid, and tetrahydrophthalic acid; alicyclic dicarboxylic acids such as hydrogenated forms of such aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkyl succinic acids, linolenic acid, maleic acid, fumaric acid, mesaconic acid, citraconic acid, and itaconic acid. Other forms, such as anhydrides, salts, and derivatives (alkyl esters and acid halides), can also be used as an acid component. Examples of components that form an ester with an acid component include polyols such as diols and triols, and glycols such as (poly)alkylene glycols. Examples of polyols and glycols include those listed above as examples of components of polyether polyols.

Examples of polycarbonate polyols that can be used include those produced by known processes. Specific examples include alkanediol-based polycarbonate diols, such as polyhexamethylene carbonate diol. Other examples include polycarbonate diols obtained through the reaction between a carbonate component or phosgene and an aliphatic diol component. Examples of carbonate components include alkylene carbonates, diaryl carbonates, and dialkyl carbonates.

The number-average molecular weight of a long-chain polyol, such as polyester polyol, polycarbonate polyol, or polyether polyol, can be 450 or more and 4,000 or less. In particular, it is preferred to use a polyether polyol having a number-average molecular weight of 450 or more and 4,000 or less. Reducing the number-average molecular weight of a long-chain polyol often enhances the strength of urethane resin film because of an increased number of urethane bonds in the urethane resin and increased stiffness of the polyol. Increasing the number-average molecular weight of a long-chain polyol that reacts with the polyisocyanate often enhances the flexibility of urethane resin film because of a reduced number of urethane bonds in the urethane resin and increased stretchability of the polyol. Ensuring that the number-average molecular weight of a long-chain polyol is 450 or more and 4,000 or less therefore provides recorded images with particularly high highlighter resistance as a result of a good balance between the strength and flexibility of urethane resin film. Making the number-average molecular weight of a long-chain polyol less than 450 can cause the highlighter resistance not to be sufficiently high because in such a case urethane resin film would be rigid and brittle. Making the number-average molecular weight of a long-chain polyol more than 4,000 can also cause the highlighter resistance not to be sufficiently high because in such a case urethane resin film would be too flexible.

Examples of diols containing an acidic group, which are specific examples of short-chain polyols, include diols having a carboxylic acid group, a sulfonic acid group, a phosphonic acid group, or any similar kind of acidic group. In particular, diols having a carboxylic acid group, such as dimethylolacetic acid, dimethylolpropionic acid, dimethylolbutanoic acid, and dimethylolbutyric acid, are preferred, and dimethylolpropionic acid and dimethylolbutanoic acid are more preferred. The acidic groups in the urethane resin, which are mostly that of a unit derived from an acidic-group-containing diol, are neutralized, as will be described hereinafter. In an embodiment of the invention, in which the acid value of the urethane resin is 40 mg KOH/g or more and 140 mg KOH/g or less, an example of a possible way to adjust the acid value of the urethane resin is to use an appropriate amount of an acidic-group-containing diol.

Cross-Linking Agent or Chain Extender

The urethane resin may contain a cross-linking agent or a chain extender. Usually, a cross-linking agent is used in synthesizing a prepolymer, and a chain extender is used in a chain-extending reaction that follows the synthesis of a prepolymer. The cross-linking agent or chain extender can basically be one selected from substances such as the above-listed polyisocyanates, polyols, and polyamines as deemed appropriate for the intended application, e.g., cross-linking or chain extension. The chain extender can also be an agent that allows the urethane resin to form cross links.

Acid Value

In an embodiment of the invention, the acid value of the urethane resin is 40 mg KOH/g or more and 140 mg KOH/g or less. Making this acid value less than 40 mg KOH/g causes insufficient ejection stability of the ink. Making this acid value more than 140 mg KOH/g causes insufficient highlighter resistance of images because in such a case urethane resin film would be brittle for the following reasons. Increasing the acid value makes the proportion of the unit containing an acidic group (a short-chain polyol) in the urethane resin higher, and therefore makes the proportion of the unit derived from a polyether polyol (a long-chain polyol) lower. The increased number of urethane bonds in the urethane resin and the reduced amount of the long-chain unit lead to too high strength and too low flexibility of urethane resin film, making the urethane resin film brittle. The acid value of the urethane resin is preferably 60 mg KOH/g or more, more preferably 80 mg KOH/g or more, and preferably 120 mg KOH/g or less, more preferably 100 mg KOH/g or less.

The acid value of the urethane resin can be measured using titration. In the Examples, the acid value of urethane resins dissolved in tetrahydrofuran was measured using potentiometric colloidal titration with an automatic potentiometric titrator (trade name, AT-510; Kyoto Electronics Manufacturing) equipped with a stream potential titration unit (PCD-500). A solution of potassium hydroxide in ethanol was used as titrant.

Molar Ratio of Urethane Bonds/Urea Bonds

As mentioned herein, the molar ratio of urethane bonds/urea bonds is a fractional representation of the proportion (% by mole) of urethane bonds and that of urea bonds (% by mole) in the urethane resin with the total as 100.0% by mole. A molar ratio of 80.0/20.0 or more means that the proportion of urethane bonds is 80.0% by mole or more. The proportion of urea bonds is therefore 20.0% by mole or less (equal to or less than the result of a subtraction of 80.0% by mole for urethane bonds from the total of 100.0% by mole). The "molar ratio of the proportion (% by mole) of urethane bonds in the urethane resin to the proportion (% by mole) of urea bonds" may be herein referred to as the "molar ratio of urethane bonds/urea bonds" for the sake of simplicity.

In an embodiment of the invention, the molar ratio of the proportion (% by mole) of urethane bonds in the urethane resin to the proportion (% by mole) of urea bonds is 80.0/20.0 or more. Making this molar ratio less than 80.0/20.0 (i.e., making the ratio of urethane bonds less than 80.0% by mole) causes the ejection accuracy to be insufficient initially and over time because in such a case the urethane resin would be highly adhesive to the ejection orifice surface of a recording head owing to the high proportion of urea bonds.

The molar ratio of urethane bonds/urea bonds is preferably 85.0/15.0 or more. Ensuring that the molar ratio of urethane bonds/urea bonds falls within this range enhances the initial ejection accuracy because in such a case the urethane resin is effectively prevented from adhering to the ejection orifice surface of a recording head. More preferably, the molar ratio of urethane bonds/urea bonds is 90.0/10.0 or more. Ensuring the molar ratio of urethane bonds/urea bonds falls within this range leads to particularly effective prevention of the drop of ejection accuracy over time, in addition to enhancing the initial ejection accuracy. It is also preferred that the molar ratio of urethane bonds/urea bonds be 98.5/1.5 or less. When the molar ratio of urethane bonds/urea bonds falls within this range, the urethane resin contains a certain number of urea groups, i.e., groups very likely to form hydrogen bonds. The resulting hard segment improves the strength of urethane resin film, leading to a higher level of highlighter resistance of images.

Examples of ways to adjust the molar ratio of urethane bonds/urea bonds include the following two methods. The first method is to, in synthesizing the urethane resin, adjust the amount of an amine compound that reacts with a polyisocyanate. In this method, the amount of formation of urea bonds through the reaction between the amine compound and isocyanate groups is controlled. A detailed description of a process for synthesizing the urethane resin is as follows. First, multiple urethane resins are synthesized with different amounts of an amine compound, and the molar ratios of urethane bonds/urea bonds are calculated using the method described hereinafter. The obtained molar ratios are used to identify the relationship between the amount of use of the amine compound and the molar ratio and create a calibration curve. This calibration curve is used to determine the amount of the amine compound that provides a urethane resin having a desired molar ratio. The reason why the calibration curve is created first is that the use of a given amine compound does not always result in the same molar ratio because the rate of reaction and other conditions may vary according to the kinds of the other components.

The second method is to adjust the proportion of unreacted isocyanate groups during the phase inversion of the urethane resin to water. In this method, the amount of formation of urea bonds through the reaction between water and isocyanate groups is controlled. A detailed description of a process for synthesizing the urethane resin is as follows. The proportion of unreacted isocyanate groups based on the amount of polyisocyanate used is monitored using a Fourier transform infrared spectrophotometer (FT-IR) during the reaction for the synthesis of the urethane resin. The proportion of unreacted isocyanate groups can be adjusted by changing the duration of reaction, the amount of use of polyisocyanate, and other reaction conditions. Ion-exchanged water is added to the reaction system when the proportion of unreacted isocyanate groups matches the desired molar ratio of urethane bonds/urea bonds. For example, when one wants to synthesize a urethane resin having a molar ratio of urethane bonds/urea bonds of 95.0/5.0, ion-exchanged water is added when the proportion of unreacted isocyanate groups derived from the loaded polyisocyanate is 5.0% by mole. In the Examples, this second method was used to adjust the molar ratio of urethane bonds/urea bonds of urethane resins.

Polyamines can be used as a reaction partner for the polyisocyanate, a chain extender, a cross-linking agent, and so forth. However, reaction between isocyanate groups and an amine forms urea bonds. When a polyamine is used, its amount of use can be such that the urethane resin has a desired molar ratio of urethane bonds/urea bonds.

The molar ratio of urethane bonds/urea bonds of the urethane resin can be identified as follows. More specifically, it is determined from the ratio between the integrated intensities of the peaks corresponding to the urethane bond and the urea bond obtained through a carbon nuclear magnetic resonance spectroscopic analysis ($^{13}$C-NMR) of a solution of the urethane resin in deuterated dimethyl sulfoxide. It should be noted that the positions of the peaks corresponding to the urethane bond and the urea bond may vary according to the kinds of the compounds used to synthesize the urethane resin. It is therefore needed to locate the peaks corresponding to the urethane bond and the urea bond specific to the compounds used to synthesize the urethane resin. The following describes a method for this.

First, the composition of the urethane resin, or more specifically a polyisocyanate and its reaction partner (e.g., a polyol or an acidic-group-containing diol), is analyzed. The analysis of the composition of the urethane resin can be performed using the method described hereinafter. Then the chemical shifts of the urethane bond and the urea bond specific to the polyisocyanate are determined through the following procedure. Reaction products are prepared using the polyisocyanate and each of its potential reaction partners (a polyol, an acidic-group-containing diol, a polyamine, and water). For example, when a combination of a polyol and an acidic-group-containing diol is used, the following materials are individually prepared: (i) the reaction product of the polyisocyanate and the polyol, (ii) the reaction product of the polyisocyanate and the acidic-group-containing diol, and (iii) the reaction product of the polyisocyanate and water. The prepared reaction products are dissolved in deuterated dimethyl sulfoxide, and the solutions are analyzed using carbon nuclear magnetic resonance spectroscopy ($^{13}$C-NMR) for the chemical shifts of the urethane bond and the urea bond in each reaction product.

In the above example, reaction products (i) and (ii) are used to determine the chemical shift of the urethane bond, and reaction product (iii) is used to determine the chemical shift of the urea bond. The obtained chemical shifts are used to identify the peaks corresponding to the urethane bond and the urea bond, and the ratio between the integrated intensities of these peaks is used to calculate the molar ratio of urethane bonds/urea bonds of the urethane resin. The chemical shifts of a urethane resin in which the isocyanate is isophorone diisocyanate, for example, are around 155 ppm for the urethane bond and 158 ppm for the urea bond, although slightly varying according to measurement conditions and the composition of the urethane resin.

In the Examples, the molar ratio of urethane bonds/urea bonds of urethane resins was determined as follows. An excess of acid (hydrochloric acid) was added to a liquid containing a synthesized urethane resin, and the urethane resin that separated out was collected and dried. A solution of the dried resin in deuterated dimethyl sulfoxide was analyzed through carbon nuclear magnetic resonance spectroscopy ($^{13}$C-NMR) using an NMR analyzer (trade name "Avance 500," BRUKER Bio Spin) for the integrated intensities of the peaks of the chemical shifts of the urethane bond and the urea bond. The ratio between these integrated intensities of peaks was used to determine the molar ratio of urethane bonds/urea bonds.

Neutralizing Agents

The acidic groups in the urethane resin are neutralized with an alkali metal ion and at least one ammonium type ion selected from the ammonium ion and an organic ammonium ion, with the neutralization ratio of all acidic groups in the urethane resin being 80% or more and the neutralization ratio with the ammonium type ion being 1% or more and less than 45%. Making the neutralization ratio of all acidic groups less than 80% causes insufficient ejection stability of the ink because in such a case it would be difficult for the urethane resin to exist stably in the ink. The neutralization ratio of all acidic groups is preferably 100% or less.

Making the neutralization ratio with the ammonium type ion less than 1% causes insufficient ejection accuracy over time because in such a case the decrease in the pH of the ink caused by a proton resulting from the decomposition of the urethane resin could not be controlled. Making the neutralization ratio with the ammonium type ion 45% or more causes insufficient ejection stability of the ink. Preferably, the neutralization ratio with the ammonium type ion is 2% or more and 40% or less. Ensuring that the neutralization ratio with the ammonium type ion is 2% or more leads to effective prevention of the drop of ejection accuracy over time, and ensuring that this ratio is 40% or less leads to a higher level of ejection stability of the ink.

The neutralization ratio with the alkali metal ion can be determined from the relationship between the neutralization ratio of all acidic groups and the neutralization ratio with the ammonium type ion. Specifically, the neutralization ratio with the alkali metal ion is preferably 45% or more and less than 99%, more preferably 46% or more and 98% or less.

Examples of alkali metal ions include lithium, sodium, and potassium ions. The neutralization of the acidic groups in the urethane resin with an alkali metal ion can be done through the use of an alkali metal hydroxide (e.g., lithium hydroxide, sodium hydroxide, or potassium hydroxide). In this case, an alkali metal ion formed as a result of the ionic dissociation of the alkali metal hydroxide neutralizes the acidic groups in the urethane resin. The alkali metal ion is preferably the potassium ion.

Examples of ammonium type ions include the ammonium ion ($NH_4^+$) and organic ammonium ions ($NX_4^+$, where X represents a hydrogen atom or an organic group, and at least one of the Xs is an organic group). The neutralization of the acidic groups in the urethane resin with an ammonium type ion can be done through the use of a compound represented by formula (1) or a compound represented by formula (2). In this case, an ammonium type ion resulting from the ionization or ionic dissociation of the compound neutralizes the acidic groups in the urethane resin. In the following, the term "mono- to tri-" means mono-, di-, and tri-, and "mono- to tetra-" means mono-, di-, tri-, and tetra-.

$NR_1R_2R_3$  Formula (1)

In formula (1), each of $R_1$, $R_2$, and $R_3$ independently represents a hydrogen atom, an alkyl group having one to six carbon atoms, or a hydroxyalkyl group having one to six carbon atoms.

Examples of compounds represented by formula (1) include the following: ammonia; aliphatic amines such as mono- to tri-methylamine, mono- to tri-ethylamine, mono- to tri-propylamine, mono- to tri-butylamine, mono- to tri-pentylamine, and mono- to tri-hexylamine; and alkanolamines such as mono- to tri-ethanolamine, mono- to tri-isopropanolamine, dimethylethanolamine, and methyldiethanolamine.

A compound represented by formula (1) ionizes in the ink as follows, and the resulting ammonium type ion neutralizes the acidic groups in the urethane resin.

$NR_1R_2R_3 + H_2O \rightarrow N^+HR_1R_2R_3 + OH^-$ $N^+R_1R_2R_3R_4A^-$  Formula (2)

In formula (2), each of $R_1$, $R_2$, $R_3$, and $R_4$ independently represents a hydrogen atom, an alkyl group having one to six carbon atoms, or a hydroxyalkyl group having one to six carbon atoms. $A^-$ represents a monovalent anion.

Examples of compounds represented by formula (2) include the following: ammonium salts; aliphatic amine salts such as mono- to tetra-methylamine salts, mono- to tetra-ethylamine salts, mono- to tetra-propylamine salts, mono- to tetra-butylamine salts, mono- to tetra-pentylamine salts, and mono- to tetra-hexylamine salts; and alkanolamine salts such as mono- to tetra-ethanolamine salts and mono- to tetra-isopropanolamine salts. Examples of monovalent anions ($A^-$) that can be a constituent of a compound represented by formula (2) (an ammonium salt or an amine salt) include: the hydroxide ion; halide ions; and monovalent inorganic acid anions. Examples of halide ions include the fluoride ion ($F^-$), the chloride ion ($Cl^-$), the bromide ion ($Br^-$), and the iodide ion ($I^-$). Examples of monovalent inorganic acid anions include the nitrate ion ($NO_3^-$).

A compound represented by formula (2) undergoes ionic dissociation in the ink as follows, and the resulting ammonium type ion neutralizes the acidic groups in the urethane resin.

$N^+R_1R_2R_3R_4A^- \rightarrow N^+R_1R_2R_3R_4 + A^-$

Preferably, the ammonium type ion used to neutralize the acidic groups in the urethane resin is one resulting from the ionization of a compound represented by formula (1), more preferably $N^+H(CH_2CH_2OH)_3$ (a cation derived from triethanolamine). The use of $N^+H(CH_2CH_2OH)_3$ leads to particularly effective prevention of the drop of ejection accuracy over time.

The kinds of the neutralizing agents for the acidic groups in the urethane resin can be analyzed using urethane resin isolated from the ink. The isolated urethane resin is diluted in water to yield a solution for use as a sample, and the neutralizing agents isolated from this sample through electrophoresis chromatography are identified and quantified using techniques such as mass spectrometry and NMR. Then the neutralization ratio with each agent can be calculated from the acid value measured using the method described above. In the Examples, the following analysis was conducted. First, a liquid containing a urethane resin was diluted in water. Then neutralizing agents were isolated from the obtained sample through electrophoresis chromatography (trade name "Agilent 1600 CE," Agilent Technologies), and the neutralizing agents were identified and quantified using mass spectrometry. The identities and quantities of the neutralizing agents determined in this way and the acid value measured using the method described above were used to calculate the neutralization ratio with each agent. Performing the ordinary procedure for preparing ink should not change the neutralizing agents for the acidic groups in the urethane resin unless the pH deviates from the range of approximately 5.0 to 10.0, pH values common to aqueous inks for ink jet.

Process of Synthesis

Processes that have been commonly used to synthesize urethane resin can all be used to synthesize a urethane resin for an ink according to an embodiment of the invention. An example is the following process. A prepolymer that has terminal isocyanate groups is synthesized through the reaction between a polyisocyanate and its reaction partner (a polyol or an acidic-group-containing diol). The amounts of use of the two materials are such that isocyanate groups are large in number. An organic solvent that has a boiling point of 100° C. or lower may be optionally used. The prepolymer is then added to a liquid that contains a chain extender or a cross-linking agent for chain-extending reaction or cross-linking reaction. Then the acidic groups in the prepolymer are neutralized using two neutralizing agents for predetermined neutralization ratios, and the organic solvent is removed if used. In this way, urethane resin is obtained.

Process of Analysis

The composition of the urethane resin can be analyzed using the methods described below. A method for extracting the urethane resin from an ink that contains the urethane resin is first described. Specifically, the urethane resin can be extracted by precipitation through the addition of an excess of acid (e.g., hydrochloric acid) to a supernatant collected after centrifugation of the ink at 80,000 rpm. It is also possible to isolate the urethane resin by drying the supernatant. If the ink contains a pigment as coloring material, the urethane resin can also be extracted from the ink using an organic solvent that does not dissolve the pigment but dissolves the urethane resin (e.g., hexane). Although the following analyses can be done on the ink, the use of urethane resin (solid) extracted using this method allows for more accurate analyses.

The collected urethane resin is dried and dissolved in deuterated dimethyl sulfoxide, yielding a solution for use as a sample for measurement. The positions of peaks obtained through the analysis of this sample using proton nuclear magnetic resonance ($^1$H-NMR) can be used to confirm the identity of components, i.e., a polyisocyanate, a polyol or an acidic-group-containing diol, and so forth. It is also possible to calculate the composition ratio from the proportions of the integrated peak intensities corresponding to the chemical shifts of the individual components. Analysis of the urethane resin using pyrolysis gas chromatography also provides the identity of components, i.e., a polyisocyanate, a polyol or an acidic-group-containing diol, and so forth. Furthermore, it is possible to calculate the number-average molecular weight from the number of repeating units in a long-chain polyol determined through analysis using carbon nuclear magnetic resonance spectroscopy ($^{13}$C-NMR).

Coloring Material

Examples of coloring materials used in an ink according to an embodiment of the invention include: dyes such as acidic dyes and direct dyes; and pigments such as inorganic pigments and organic pigments. A combination of multiple coloring materials can also be used. When a pigment is used, the method of dispersion is not limited; the pigment can be a self-dispersible pigment, which needs no dispersant, a resin-dispersed pigment, which employs a dispersant, or any other kind of pigment. Reducing the interactions between the urethane resin and the coloring material to some extent allows film of the urethane resin to exert its characteristics in an efficient way, leading to enhanced highlighter resistance of images. If a pigment is used as coloring material, therefore, it is preferred to use a resin-dispersed pigment that employs a resin different from urethane resin as dispersant, e.g., acrylic resin, or a self-dispersible resin, which needs no dispersant.

The coloring material content (% by mass) in the ink can be 0.5% by mass or more and 10.0% by mass or less, preferably 1.0% by mass or more and 10.0% by mass or less, based on the total mass of the ink. If a pigment is used as coloring material, it is preferred to ensure that the mass ratio of the urethane resin content (% by mass) to the pigment content (% by mass) is 0.05 times or more and 2.0 times or less based on the total mass of the ink, in addition to making the urethane resin content within a preferred range specified above (0.1% by mass or more and 10.0% by mass or less). Making this mass ratio less than 0.05 times can cause the highlighter resistance of images not to be sufficiently high, and making this mass ratio more than 2.0 times can cause the ejection stability of the ink not to be sufficiently high.

An ink according to an embodiment of the invention can be a clear ink, which contains no coloring material. Applying such a clear ink to an image recorded using an ink that contains a coloring material improves the highlighter resistance of the image.

Aqueous Medium

An ink according to an embodiment of the invention is an aqueous ink that contains at least water as aqueous medium. The water can be deionized water (ion-exchanged water). The water content (% by mass) in the ink can be 10.0% by mass or more and 90.0% by mass or less, preferably 50.0% by mass or more and 90.0% by mass or less, based on the total mass of the ink.

The aqueous medium may also contain a water-soluble organic solvent. The water-soluble organic solvent can be of any kind of solvent that is soluble in water, and examples of water-soluble organic solvents that can be used include monohydric or polyhydric alcohols, (poly)alkylene glycols, glycol ethers, nitrogen-containing polar solvents, and sulfur-containing polar solvents. The water-soluble organic solvent content (% by mass) in the ink can be 3.0% by mass or more and 50.0% by mass or less based on the total mass of the ink.

Other Additives

An ink according to an embodiment of the invention may optionally contain water-soluble organic compounds that are solid at normal temperature, including polyhydric alcohols such as trimethylolpropane and trimethylolethane, urea, and urea derivatives such as ethyleneurea, in addition to the components described above. An ink according to an embodiment of the invention may optionally contain additives such as surfactants, pH adjusters, antirusts, preservatives, antimolds, antioxidants, reduction inhibitors, evaporation promoters, chelating agents, and water-soluble resins.

Characteristics of the Ink

In an embodiment of the invention, the ink can have a pH, a static surface tension, and a viscosity in the ranges specified below at 25° C. That is, the pH can be 5.0 or more and 10.0 or less, preferably 7.0 or more and 9.5 or less. The static surface tension can be 30 mN/m or more and 45 mN/m or less, preferably 35 mN/m or more and 40 mN/m or less. The viscosity can be 1.0 mPa·s or more and 5.0 mPa·s or less.

Ink Cartridge

An ink cartridge according to an embodiment of the invention has ink and an ink storage portion that stores the ink. The ink to be stored in the ink storage portion is an ink according to an embodiment of the invention described above. An illustrative structure of the ink cartridge has its ink storage portion composed of a chamber for a negative pressure generator that stays impregnated with the ink taking advantage of negative pressure (a negative pressure generator storing chamber) and an ink chamber in which the ink is stored not retained in the negative pressure generator. In a possible structure, the ink storage portion may have no ink chamber and have a negative pressure generator impregnated with all of the ink, and in another possible structure, the ink storage portion may have no negative pressure generator and store all of the ink without impregnation in a negative pressure generator. The ink cartridge can also be one that has an ink storage portion and a recording head.

Ink Jet Recording Method

An ink jet recording method according to an embodiment of the invention includes ejecting an ink according to an embodiment of the invention described above from an ink jet recording head to record an image on a record medium. Examples of modes of ejection of the ink include one in which mechanical energy is applied to the ink and one in which thermal energy is applied to the ink. In an embodiment of the invention, it is particularly preferred to use a mode of ejection in which thermal energy is applied to the ink to eject the ink. Except for the use of an ink according to an embodiment of the invention, operations in the ink jet recording method can be the same as those in known methods.

EXAMPLES

The following describes certain aspects of the invention in more detail by providing examples and comparative examples. No aspect of the invention is limited to these examples while within the scope of the invention. The terms "parts" and "%" used in relation to the amount of components are based on mass unless otherwise specified.

Synthesis of Urethane Resins

To a four-necked flask equipped with a stirrer, a thermometer, a nitrogen gas introducing tube, and a reflux tube, a polyisocyanate, a polyol, and an acidic-group-containing diol were added in the amounts indicated in Table 1 with 300.0 parts of methyl ethyl ketone. The reaction was allowed to proceed in a nitrogen atmosphere at a temperature of 80° C. for 6 hours. Then a chain extender was added in the amount indicated in Table 1. While the proportion of unreacted isocyanate groups was monitored using FT-IR, the reaction was allowed to proceed at a temperature of 80° C. until a desired proportion was reached, yielding a reaction liquid. The molar ratio of urethane bonds/urea bonds was adjusted by using different amounts of the chain extender. After the obtained reaction liquid was cooled to a temperature of 40° C., ion-exchanged water was added. Neutralizing agents were added in the amounts indicated in Table 1 while the mixture was quickly stirred with a homogenizing mixer, yielding a liquid containing the resin. The obtained liquid was heated under reduced pressure until methyl ethyl ketone was distilled away. In this way, liquids containing urethane resins 1 to 50 were obtained with a urethane resin content (solid content) of 20.0%. Table 2 summarizes the characteristics of the urethane resins. The names of neutralizing agents (KOH, TEA, etc.) are listed in Table 2, and these names mean that the acidic groups of the urethane resin were neutralized with the cations corresponding to the neutralizing agents used, e.g., $K^+$ and $N^+H(CH_2CH_2OH)_3$.

The abbreviations used in Tables 1 and 2 are as follows: IPDI, isophorone diisocyanate; HDI, hexamethylene diisocyanate; H12MDI, 4,4'-dicyclohexylmethane diisocyanate; PPG, polypropylene glycol (number-average molecular weight, 2,000); PTMG, polytetramethylene glycol (number-average molecular weight, 2,000); PC, polycarbonate diol (number-average molecular weight, 2,000); PES, polyester polyol (number-average molecular weight, 2,000); DMPA, dimethylolpropionic acid; DMBA, dimethylolbutanoic acid; EDA, ethylenediamine; KOH, potassium hydroxide; LiOH, lithium hydroxide; NaOH, sodium hydroxide; TEA, triethanolamine; MonoEA, monoethylamine; DiMA, dimethylamine; TeEAC, tetraethylammonium chloride; NH4Cl, ammonium chloride; NH4NO3, ammonium nitrate; NH4OH, ammonium hydroxide.

TABLE 1

Components used to synthesize urethane resins

| | | Polyisocyanate | | Polyol | | Acidic-group-containing diol | | Chain extender | | Neutralizing agents | | | |
|---|---|---|---|---|---|---|---|---|---|---|---|---|---|
| | | Name | Amount (parts) | Name | Amount (parts) | Name | Amount (parts) | Name | Amount (parts) | Name | Amount (parts) | Name | Amount (parts) |
| Urethane resin number | 1 | IPDI | 60.5 | PPG | 110.6 | DMPA | 28.7 | EDA | 0.2 | KOH | 10.2 | TEA | 1.6 |
| | 2 | HDI | 47.0 | PPG | 124.1 | DMPA | 28.7 | EDA | 0.2 | KOH | 10.2 | TEA | 1.6 |
| | 3 | H12MDI | 70.1 | PPG | 101.0 | DMPA | 28.7 | EDA | 0.2 | KOH | 10.2 | TEA | 1.6 |
| | 4 | IPDI | 60.5 | PTMG | 110.6 | DMPA | 28.7 | EDA | 0.2 | KOH | 10.2 | TEA | 1.6 |
| | 5 | IPDI | 60.2 | PPG | 107.9 | DMBA | 31.7 | EDA | 0.2 | KOH | 10.2 | TEA | 1.6 |
| | 6 | IPDI | 47.3 | PPG | 133.4 | DMPA | 19.1 | EDA | 0.2 | KOH | 6.8 | TEA | 1.1 |
| | 7 | IPDI | 113.3 | PPG | 19.7 | DMPA | 66.9 | EDA | 0.1 | KOH | 23.8 | TEA | 3.7 |
| | 8 | IPDI | 60.5 | PPG | 110.6 | DMPA | 28.7 | EDA | 0.2 | KOH | 9.0 | TEA | 1.6 |
| | 9 | IPDI | 60.5 | PPG | 110.6 | DMPA | 28.7 | EDA | 0.2 | KOH | 11.4 | TEA | 1.6 |
| | 10 | IPDI | 62.5 | PPG | 108.0 | DMPA | 28.7 | EDA | 0.8 | KOH | 10.2 | TEA | 1.6 |
| | 11 | IPDI | 61.8 | PPG | 108.9 | DMPA | 28.7 | EDA | 0.6 | KOH | 10.2 | TEA | 1.6 |
| | 12 | IPDI | 61.8 | PPG | 108.9 | DMPA | 28.7 | EDA | 0.6 | KOH | 10.2 | TEA | 1.6 |
| | 13 | IPDI | 61.1 | PPG | 109.8 | DMPA | 28.7 | EDA | 0.4 | KOH | 10.2 | TEA | 1.6 |
| | 14 | IPDI | 61.1 | PPG | 109.8 | DMPA | 28.7 | EDA | 0.4 | KOH | 10.2 | TEA | 1.6 |
| | 15 | IPDI | 60.1 | PPG | 111.1 | DMPA | 28.7 | EDA | 0.1 | KOH | 10.2 | TEA | 1.6 |
| | 16 | IPDI | 60.1 | PPG | 111.1 | DMPA | 28.7 | EDA | 0.1 | KOH | 10.2 | TEA | 1.6 |
| | 17 | IPDI | 60.0 | PPG | 111.3 | DMPA | 28.7 | — | 0.0 | KOH | 10.2 | TEA | 1.6 |
| | 18 | IPDI | 60.5 | PPG | 110.6 | DMPA | 28.7 | EDA | 0.2 | KOH | 10.7 | TEA | 0.3 |
| | 19 | IPDI | 60.5 | PPG | 110.6 | DMPA | 28.7 | EDA | 0.2 | KOH | 10.6 | TEA | 0.6 |
| | 20 | IPDI | 60.5 | PPG | 110.6 | DMPA | 28.7 | EDA | 0.2 | KOH | 6.0 | TEA | 12.8 |
| | 21 | IPDI | 60.5 | PPG | 110.6 | DMPA | 28.7 | EDA | 0.2 | KOH | 5.5 | TEA | 14.0 |
| | 22 | IPDI | 60.5 | PPG | 110.6 | DMPA | 28.7 | EDA | 0.2 | KOH | 10.2 | MonoEA | 0.5 |
| | 23 | IPDI | 60.5 | PPG | 110.6 | DMPA | 28.7 | EDA | 0.2 | KOH | 10.2 | DiMA | 0.5 |
| | 24 | IPDI | 60.5 | PPG | 110.6 | DMPA | 28.7 | EDA | 0.2 | KOH | 10.2 | TeEAC | 1.8 |
| | 25 | IPDI | 60.5 | PPG | 110.6 | DMPA | 28.7 | EDA | 0.2 | KOH | 10.2 | NH4Cl | 0.6 |
| | 26 | IPDI | 60.5 | PPG | 110.6 | DMPA | 28.7 | EDA | 0.2 | KOH | 10.2 | NH4NO3 | 0.9 |
| | 27 | IPDI | 60.5 | PPG | 110.6 | DMPA | 28.7 | EDA | 0.2 | LiOH | 4.4 | TEA | 1.6 |
| | 28 | IPDI | 60.5 | PPG | 110.6 | DMPA | 28.7 | EDA | 0.2 | NaOH | 7.3 | TEA | 1.6 |
| | 29 | IPDI | 62.5 | PPG | 108.0 | DMPA | 28.7 | EDA | 0.8 | NaOH | 7.3 | NH4OH | 0.4 |
| | 30 | IPDI | 61.8 | PPG | 108.9 | DMPA | 28.7 | EDA | 0.6 | NaOH | 7.6 | NH4OH | 0.1 |
| | 31 | IPDI | 61.8 | PPG | 108.9 | DMPA | 28.7 | EDA | 0.6 | NaOH | 3.9 | NH4OH | 3.3 |
| | 32 | IPDI | 61.1 | PPG | 109.8 | DMPA | 28.7 | EDA | 0.4 | NaOH | 7.6 | NH4OH | 0.1 |
| | 33 | IPDI | 61.1 | PPG | 109.8 | DMPA | 28.7 | EDA | 0.4 | NaOH | 3.9 | NH4OH | 3.3 |

TABLE 1-continued

Components used to synthesize urethane resins

| | | Polyisocyanate | | Polyol | | Acidic-group-containing diol | | Chain extender | | Neutralizing agents | | | |
|---|---|---|---|---|---|---|---|---|---|---|---|---|---|
| | | Name | Amount (parts) | Name | Amount (parts) | Name | Amount (parts) | Name | Amount (parts) | Name | Amount (parts) | Name | Amount (parts) |
| | 34 | IPDI | 60.1 | PPG | 111.1 | DMPA | 28.7 | EDA | 0.1 | NaOH | 7.6 | NH4OH | 0.1 |
| | 35 | IPDI | 60.1 | PPG | 111.1 | DMPA | 28.7 | EDA | 0.1 | NaOH | 3.9 | NH4OH | 3.3 |
| | 36 | IPDI | 60.5 | PPG | 110.6 | DMPA | 28.7 | EDA | 0.2 | NaOH | 7.6 | NH4OH | 0.1 |
| | 37 | IPDI | 60.5 | PPG | 110.6 | DMPA | 28.7 | EDA | 0.2 | NaOH | 3.9 | NH4OH | 3.3 |
| | 38 | IPDI | 60.5 | PPG | 110.6 | DMPA | 28.7 | EDA | 0.2 | NaOH | 7.3 | TEA | 1.6 |
| | 39 | IPDI | 60.5 | PC | 110.6 | DMPA | 28.7 | EDA | 0.2 | KOH | 10.2 | TEA | 1.6 |
| | 40 | IPDI | 60.5 | PES | 110.6 | DMPA | 28.7 | EDA | 0.2 | KOH | 10.2 | TEA | 1.6 |
| | 41 | IPDI | 46.6 | PPG | 134.6 | DMPA | 18.6 | EDA | 0.2 | KOH | 6.6 | TEA | 1.0 |
| | 42 | IPDI | 113.9 | PPG | 18.6 | DMPA | 67.4 | EDA | 0.1 | KOH | 24.0 | TEA | 3.7 |
| | 43 | IPDI | 62.7 | PPG | 107.7 | DMPA | 28.7 | EDA | 0.9 | KOH | 10.2 | TEA | 1.6 |
| | 44 | IPDI | 66.6 | PPG | 102.6 | DMPA | 28.7 | EDA | 2.1 | KOH | 10.2 | TEA | 1.6 |
| | 45 | IPDI | 60.5 | PPG | 110.6 | DMPA | 28.7 | EDA | 0.2 | — | 0.0 | TEA | 28.7 |
| | 46 | IPDI | 60.5 | PPG | 110.6 | DMPA | 28.7 | EDA | 0.2 | KOH | 10.8 | — | 0.0 |
| | 47 | IPDI | 60.5 | PPG | 110.6 | DMPA | 28.7 | EDA | 0.2 | KOH | 8.9 | TEA | 1.6 |
| | 48 | IPDI | 60.5 | PPG | 110.6 | DMPA | 28.7 | EDA | 0.2 | KOH | 7.8 | TEA | 1.6 |
| | 49 | IPDI | 60.5 | PPG | 110.6 | DMPA | 28.7 | EDA | 0.2 | KOH | 10.7 | TEA | 0.3 |
| | 50 | IPDI | 60.5 | PPG | 110.6 | DMPA | 28.7 | EDA | 0.2 | KOH | 5.4 | TEA | 14.4 |

TABLE 2

Characteristics of the urethane resins

| | | Neutralization ratios | | | | | Acid value (mgKOH/g) | Molar ratio of urethane bonds/urea bonds |
|---|---|---|---|---|---|---|---|---|
| | | Neutralization ratio of acidic groups (%) | Neutralizing agent 1 | Neutralization ratio with neutralizing agent 1 (%) | Neutralizing agent 2 | Neutralization ratio with neutralizing agent 2 (%) | | |
| Urethane resin number | 1 | 90 | KOH | 85 | TEA | 5 | 60 | 95.0/5.0 |
| | 2 | 90 | KOH | 85 | TEA | 5 | 60 | 95.0/5.0 |
| | 3 | 90 | KOH | 85 | TEA | 5 | 60 | 95.0/5.0 |
| | 4 | 90 | KOH | 85 | TEA | 5 | 60 | 95.0/5.0 |
| | 5 | 90 | KOH | 85 | TEA | 5 | 60 | 95.0/5.0 |
| | 6 | 90 | KOH | 85 | TEA | 5 | 40 | 95.0/5.0 |
| | 7 | 90 | KOH | 85 | TEA | 5 | 140 | 95.0/5.0 |
| | 8 | 80 | KOH | 75 | TEA | 5 | 60 | 95.0/5.0 |
| | 9 | 100 | KOH | 95 | TEA | 5 | 60 | 95.0/5.0 |
| | 10 | 90 | KOH | 85 | TEA | 5 | 60 | 80.0/20.0 |
| | 11 | 90 | KOH | 85 | TEA | 5 | 60 | 84.9/15.1 |
| | 12 | 90 | KOH | 85 | TEA | 5 | 60 | 85.0/15.0 |
| | 13 | 90 | KOH | 85 | TEA | 5 | 60 | 89.9/10.1 |
| | 14 | 90 | KOH | 85 | TEA | 5 | 60 | 90.0/10.0 |
| | 15 | 90 | KOH | 85 | TEA | 5 | 60 | 98.5/1.5 |
| | 16 | 90 | KOH | 85 | TEA | 5 | 60 | 98.6/1.4 |
| | 17 | 90 | KOH | 85 | TEA | 5 | 60 | 100.0/0.0 |
| | 18 | 90 | KOH | 89 | TEA | 1 | 60 | 95.0/5.0 |
| | 19 | 90 | KOH | 88 | TEA | 2 | 60 | 95.0/5.0 |
| | 20 | 90 | KOH | 50 | TEA | 40 | 60 | 95.0/5.0 |
| | 21 | 90 | KOH | 46 | TEA | 44 | 60 | 95.0/5.0 |
| | 22 | 90 | KOH | 85 | MonoEA | 5 | 60 | 95.0/5.0 |
| | 23 | 90 | KOH | 85 | DiMA | 5 | 60 | 95.0/5.0 |
| | 24 | 90 | KOH | 85 | TeEAC | 5 | 60 | 95.0/5.0 |
| | 25 | 90 | KOH | 85 | NH4Cl | 5 | 60 | 95.0/5.0 |
| | 26 | 90 | KOH | 85 | NH4NO3 | 5 | 60 | 95.0/5.0 |
| | 27 | 90 | LiOH | 85 | TEA | 5 | 60 | 95.0/5.0 |
| | 28 | 90 | NaOH | 85 | TEA | 5 | 60 | 95.0/5.0 |
| | 29 | 90 | NaOH | 85 | NH4OH | 5 | 60 | 80.0/20.0 |
| | 30 | 90 | NaOH | 89 | NH4OH | 1 | 60 | 84.9/15.1 |
| | 31 | 90 | NaOH | 46 | NH4OH | 44 | 60 | 84.9/15.1 |
| | 32 | 90 | NaOH | 89 | NH4OH | 1 | 60 | 89.9/10.1 |
| | 33 | 90 | NaOH | 46 | NH4OH | 44 | 60 | 89.9/10.1 |
| | 34 | 90 | NaOH | 89 | NH4OH | 1 | 60 | 98.6/1.4 |
| | 35 | 90 | NaOH | 46 | NH4OH | 44 | 60 | 98.6/1.4 |
| | 36 | 90 | NaOH | 89 | NH4OH | 1 | 60 | 95.0/5.0 |
| | 37 | 90 | NaOH | 46 | NH4OH | 44 | 60 | 95.0/5.0 |
| | 38 | 90 | NaOH | 85 | TEA | 5 | 60 | 95.0/5.0 |
| | 39 | 90 | KOH | 85 | TEA | 5 | 60 | 95.0/5.0 |
| | 40 | 90 | KOH | 85 | TEA | 5 | 60 | 95.0/5.0 |
| | 41 | 90 | KOH | 85 | TEA | 5 | 39 | 95.0/5.0 |

TABLE 2-continued

Characteristics of the urethane resins

| | Neutralization ratios | | | | | Acid value (mgKOH/g) | Molar ratio of urethane bonds/urea bonds |
|---|---|---|---|---|---|---|---|
| | Neutralization ratio of acidic groups (%) | Neutralizing agent 1 | Neutralization ratio with neutralizing agent 1 (%) | Neutralizing agent 2 | Neutralization ratio with neutralizing agent 2 (%) | | |
| 42 | 90 | KOH | 85 | TEA | 5 | 141 | 95.0/5.0 |
| 43 | 90 | KOH | 85 | TEA | 5 | 60 | 79.0/21.0 |
| 44 | 90 | KOH | 85 | TEA | 5 | 60 | 60.0/40.0 |
| 45 | 90 | — | 0 | TEA | 90 | 60 | 95.0/5.0 |
| 46 | 90 | KOH | 90 | — | 0 | 60 | 95.0/5.0 |
| 47 | 79 | KOH | 74 | TEA | 5 | 60 | 95.0/5.0 |
| 48 | 70 | KOH | 65 | TEA | 5 | 60 | 95.0/5.0 |
| 49 | 90 | KOH | 89.1 | TEA | 0.9 | 60 | 95.0/5.0 |
| 50 | 90 | KOH | 45 | TEA | 45 | 60 | 95.0/5.0 |

Preparation of Liquid Containing Coloring Material
Pigment Dispersion Liquid 1

The following materials were mixed: 20.0 g of carbon black, 11.0 mmol of the monosodium salt of ((4-aminobenzoylamino)-methan-1,1-diyl)bisphosphonic acid, 20.0 mmol of nitric acid, and 200.0 mL of purified water. The mixture was homogenized at room temperature at 6,000 rpm with a Silverson mixer. Thirty minutes later, a solution of 20.0 mmol of sodium nitrite in a small amount of water was slowly added to the mixture. This mixing operation increased the temperature of the mixture to 60° C., at which the reaction was allowed to proceed for 1 hour. Then the pH of the mixture was adjusted to 10 with an aqueous sodium hydroxide solution. Thirty minutes later, 20.0 mL of purified water was added, and diafiltration was performed using SPECTRUM membranes. Ion exchange was performed to change the counter ion of the anionic group of the self-dispersible pigment to potassium ions, and then the concentration of solid pigment was adjusted. In this way, pigment dispersion liquid 1 was obtained. Pigment dispersion liquid 1 contained a self-dispersible pigment in which ((4-aminobenzoylamino)-methan-1,1-diyl)bisphosphonic acid groups with counter potassium ions were bonded to surfaces of particles, and its pigment content was 10.0%.

Pigment Dispersion Liquid 2

To a solution of 5.0 g of concentrated hydrochloric acid in 5.5 g of water, 1.5 g of 4-amino-1,2-benzenedicarboxylic acid cooled to a temperature of 5° C. was added. A solution of 1.8 g of sodium nitrite in 9.0 g of water at 5° C. was added to the first solution with the temperature maintained at 10° C. or lower by stirring the solution with the vessel in an ice bath. After an additional 15-minute stirring of the mixed solution, 6.0 g of carbon black was added while the solution was stirred. Additional 15 minutes of stirring yielded slurry. The obtained slurry was filtered through a filter paper (trade name "Standard Filter Papers No. 2," ADVANTEC), and the collected pigment particles were thoroughly washed with water and dried in an oven at a temperature of 110° C. The prepared self-dispersible pigment was subjected to ion exchange, which changed the counter ion of the anionic group of the self-dispersible pigment to potassium ions, and then the concentration of solid pigment was adjusted. In this way, pigment dispersion liquid 2 was obtained. Pigment dispersion liquid 2 contained a self-dispersible pigment in which phthalic acid groups with counter potassium ions were bonded to surfaces of particles, and its pigment content was 10.0%.

Pigment Dispersion Liquid 3

A commercially available pigment dispersion liquid containing a self-dispersible pigment (trade name "CAB-O-JET 470Y," Cabot) was prepared. The pigment species of this self-dispersible pigment is C.I. Pigment Yellow 74. Ion exchange was performed to change the counter ion of the anionic group of the self-dispersible pigment to potassium ions, and then the concentration of solid pigment was adjusted. In this way, pigment dispersion liquid 3 was obtained. Pigment dispersion liquid 3 contained a self-dispersible pigment in which functional groups having phenylene groups and phosphonic acid groups with counter potassium ions were bonded to surfaces of particles, and its pigment content was 10.0%.

Pigment Dispersion Liquid 4

A commercially available pigment dispersion liquid containing a self-dispersible pigment (trade name "CAB-O-JET 450C," Cabot) was prepared. The pigment species of this self-dispersible pigment is C.I. Pigment Blue 15:4. Ion exchange was performed to change the counter ion of the anionic group of the self-dispersible pigment to potassium ions, and then the concentration of solid pigment was adjusted. In this way, pigment dispersion liquid 4 was obtained. Pigment dispersion liquid 4 contained a self-dispersible pigment in which functional groups having phenylene groups and phosphonic acid groups with counter potassium ions were bonded to surfaces of particles, and its pigment content was 10.0%.

Pigment Dispersion Liquid 5

A commercially available pigment dispersion liquid containing a self-dispersible pigment (trade name "CAB-O-JET 465M," Cabot) was prepared. The pigment species of this self-dispersible pigment is C.I. Pigment Red 122. Ion exchange was performed to change the counter ion of the anionic group of the self-dispersible pigment to potassium ions, and then the concentration of solid pigment was adjusted. In this way, pigment dispersion liquid 5 was obtained. Pigment dispersion liquid 5 contained a self-dispersible pigment in which functional groups having phenylene groups and phosphonic acid groups with counter potassium ions were bonded to surfaces of particles, and its pigment content was 10.0%.

Pigment Dispersion Liquid 6

A mixture of 500.0 g of ion-exchanged water and 15.0 g of carbon black was stirred at 15,000 rpm for 30 minutes for preliminary moistening of the pigment. After the addition of 4,485 g of ion-exchanged water, the pigment was dispersed with a high-pressure homogenizer. The obtained dispersion liquid was transferred to a pressure vessel and compressed with a pressure of 3.0 MPa. The pigment was then ozonated through the introduction of ozone water with an ozone concentration of 100 ppm. Ion exchange was performed to change the counter ion of the anionic group of the self-dispersible pigment to potassium ions, and then the concentration of solid pigment was adjusted. In this way, pigment dispersion liquid 6 was obtained. Pigment dispersion liquid 6 contained a self-dispersible pigment in which carboxylic acid groups with counter potassium ions were bonded to surfaces of particles, and its pigment content was 10.0%.
Pigment Dispersion Liquid 7

The following materials were mixed, yielding a mixture: 10.0 g of carbon black, 20.0 g (solid) of a water-soluble resin, and 70.0 g of water. The water-soluble resin was a styrene-acrylic acid copolymer with an acid value of 200 mg KOH/g and a weight-average molecular weight of 10,000 neutralized with a 10.0% aqueous potassium hydroxide solution. After a 1-hour dispersion in the mixture with a sand grinder, impurities were removed through centrifugation, and pressure filtration was performed using a microfilter with a pore size of 3.0 μm (Fujifilm). Then the concentration of solid pigment was adjusted. In this way, pigment dispersion liquid 7 was obtained. Pigment dispersion liquid 7 contained pigment dispersed by the water-soluble resin (a resin dispersant). Its pigment content was 10.0%, and its water-soluble resin content was 20.0%.
Aqueous Dye Solution 1

A commercially available aqueous dye solution containing C.I. Food Black 2 (Mitsubishi Chemical) was prepared. Ion exchange was performed to change the counter ion of the anionic group of the dye to potassium ions, and then the concentration of solid dye was adjusted. In this way, aqueous dye solution 1 was obtained. Aqueous dye solution 1 contained C.I. Food Black 2 with counter potassium ions, and its dye content was 10.0%.
Aqueous Dye Solution 2

A commercially available aqueous dye solution containing a sulfonated copper phthalocyanine dye (trade name "Projet Cyan 1," Fujifilm) was prepared. Ion exchange was performed to change the counter ion of the anionic group of the dye to potassium ions, and then the concentration of solid dye was adjusted. In this way, aqueous dye solution 2 was obtained. Aqueous dye solution 2 contained a sulfonated copper phthalocyanine dye with counter potassium ions, and its dye content was 10.0%.
Preparation of Inks Examples 1 to 47 and Comparative Examples 1 to 12

Inks were prepared by mixing the components listed below, and thoroughly stirring the mixture, and then filtrating the mixture through a microfilter with a pore size of 3.0 μm (Fujifilm) under pressure. Acetylenol E100 is a nonionic surfactant (an acetylene glycol ethylene oxide adduct) available from Kawaken Fine Chemicals. The ink of Example 10 contained 70.7% ion-exchanged water instead of a liquid containing coloring material.

Liquid containing coloring material (specified in Tables 3 and 4): 40.0%
Liquid containing urethane resin (urethane resin number indicated in Tables 3 and 4): 10.0%
Glycerin: 9.0%
Diethylene glycol: 5.0%
Triethylene glycol: 5.0%
Acetylenol E100: 0.3%
Ion-exchanged water: 30.7%

Comparative Examples 13 and 14

The ink of Comparative Example 13 was obtained through the adjustment of the pH of the ink of Comparative Example 7 with a small amount of potassium hydroxide. The ink of Comparative Example 14 was obtained through the adjustment of the pH of the ink of Comparative Example 8 with a small amount of triethanolamine. The inks of Comparative Examples 13 and 14 contained an alkali metal ion and an ammonium type ion. In these inks, however, the acidic groups in the urethane resin were neutralized with one of the alkali metal ion and the ammonium type ion. The other ion was just an additive to the ink, not neutralizing the acidic groups in the urethane resin.

Comparative Example 15

Eighty five percent of the acidic groups in an acrylic resin (trade name "JONCRYL 586," BASF; acid value, 108 mg KOH/g) were neutralized with potassium hydroxide, and 5% with triethanolamine. An appropriate amount of ion-exchanged water was added to yield a liquid containing acrylic resin 1 with a resin content of 20.0%. Then the ink of Comparative Example 15 was prepared in the same way as in Example 1 except that the liquid containing urethane resin 1 was changed to this liquid containing acrylic resin 1.

Comparative Example 16

Ninety percent of the acidic groups in an acrylic resin (trade name "JONCRYL 586," BASF; acid value, 108 mg KOH/g) were neutralized with potassium hydroxide. An appropriate amount of ion-exchanged water was added to yield a liquid containing acrylic resin 2 with a resin content of 20.0%. Then the ink of Comparative Example 16 was prepared in the same way as in Example 1 except that the liquid containing urethane resin 2 was changed to this liquid containing acrylic resin 2.
Evaluation The obtained inks were individually filled into ink cartridges and loaded into an ink jet recording apparatus configured to eject ink from a recording head using thermal energy (trade name "PIXUS iP3100," CANON KABUSHIKI KAISHA). In the Examples, the recording duty of a solid image recorded under conditions that ensure one drop of the ink is applied to a unit area of 1/600 inches×1/600 inches having a mass per droplet of 28 ng±10% is defined as 100%. The recording conditions were as follows: temperature, 23° C.; relative humidity, 55%. In the present invention, grades (AA,) A, and B in the evaluation criteria below mean that the ink was acceptable in terms of the specific assessment, and C means that the ink was unacceptable. The results of the evaluation are summarized in Tables 3 and 4.
Highlighter Resistance A recorded article was obtained through the recording of a 1/10-inch-thick vertical line with the aforementioned ink jet recording apparatus on a sheet of plain paper (trade name "PPC Printing Paper GF-500," CANON KABUSHIKI KAISHA). At 5 minutes and at 1 day after recording, the recorded article was marked on the vertical line with a yellow highlighter (trade name "OPTEX 2," Zebra) and subsequently in a non-recorded area on the same sheet of plain paper with the same highlighter. Then the tip of the highlighter and the mark in the non-recorded area were visually inspected for smearing, and the highlighter resistance was evaluated as per the criteria below. If the highlighter resistance of the image is low, highlighting the image on the vertical line results in the tip of the highlighter smearing with the coloring material existing in the image area. If heavily smeared, the highlighter is likely to transfer the smear to the mark put in the non-recorded area. The image gets more fixed to the record medium with time after recording. Therefore, the shorter the time after recording, the more likely the highlighter resistance is low.

A: Both at 5 minutes and at 1 day, the tip of the highlighter smeared a little, whereas the mark put in the non-recorded area was almost clean.

B: At 5 minutes, the tip of the highlighter smeared, and the mark put in the non-recorded area was smeary but not distinctively. At 1 day, the tip of the highlighter smeared a little, and the mark put in the non-recorded area was almost clean.

C: Both at 5 minutes and at 1 day, the tip of the highlighter smeared heavily and transferred the smear to the mark put in the non-recorded area.

Ejection Stability

A recorded article was obtained through the recording of a 19-cm×26-cm solid image with the aforementioned ink jet recording apparatus at a recording duty of 100% on ten sheets of A4-size plain paper (trade name "PPC Printing Paper GF-500," CANON KABUSHIKI KAISHA). The solid image on the tenth sheet of the recorded article was visually inspected, and the ejection stability was evaluated as per the following criteria.

A: Ejection was stable and the solid image had no white stripes or faded prints.

B: Ejection was stable but the solid image had some white stripes and faded prints.

C: Ejection was instable and the solid image had many white stripes and faded prints.

Ejection Accuracy (Initial)

The following cycle was performed using the aforementioned ink jet recording apparatus: recording of a 19-cm× 26-cm solid image at a recording duty of 100% on two sheets of A4-size plain paper (trade name "PPC Printing Paper GF-500," CANON KABUSHIKI KAISHA), a 30-minute pause, and recording of the same solid image on two sheets of the paper. After this cycle was repeated ten times, the nozzle check pattern of "PIXUS iP3100" was recorded on one sheet of the paper. Then the ejection accuracy (initial) was evaluated as per the criteria below through the visual inspection of the recorded nozzle check pattern and microscopic observation of the adhesive substance found on the ejection orifice surface of the used recording head. Before this evaluation, the inks were placed at normal temperature (25° C.) for 1 week after preparation.

A: Although a very small amount of adhesive substance was found, the nozzle check pattern had no irregularities.

B: A small amount of adhesive substance was found, and the nozzle check pattern had some irregularities.

C: A large amount of adhesive substance was found, and the nozzle check pattern had significant irregularities.

Ejection Accuracy (Over Time)

The ejection accuracy (over time) was evaluated as per the following criteria in the same way as in the evaluation of the ejection accuracy (initial) except that the inks were placed under a condition at a temperature of 70° C. for 2 weeks before use.

AA: Although a very small amount of adhesive substance was found, the nozzle check pattern had no irregularities, and the ink maintained a level of ejection accuracy comparable to the ejection accuracy (initial).

A: Although a very small amount of adhesive substance was found, the nozzle check pattern had few irregularities, and the ink maintained a level of ejection accuracy almost comparable to the ejection accuracy (initial), although with a slight decrease.

B: A small amount of adhesive substance was found, and the nozzle check pattern had some irregularities.

C: A large amount of adhesive substance was found, and the nozzle check pattern had significant irregularities.

The ink of Example 10, which contained no coloring material, was evaluated as follows. The highlighter resistance was evaluated in the same way and as per the same criteria as above, using a pattern image composed of a solid image recorded using the ink of Comparative Example 1 and an overcoat of the ink of Example 10. The ejection stability and the ejection accuracy (initial and over time) were evaluated in the same way and as per the same criteria as above except that an OHP film (CG3410, Sumitomo 3M) was used as record medium to make the ejected ink easier to see.

TABLE 3

Composition and results of evaluation of the inks

| | | Composition of the ink | | Evaluation results | | | |
|---|---|---|---|---|---|---|---|
| | | Urethane resin number | Liquid containing coloring material | Highlighter resistance | Ejection stability | Ejection accuracy (initial) | Ejection accuracy (over time) |
| Example | 1 | 1 | Pigment dispersion liquid 1 | A | A | A | AA |
| | 2 | 1 | Pigment dispersion liquid 2 | A | A | A | AA |
| | 3 | 1 | Pigment dispersion liquid 3 | A | A | A | AA |
| | 4 | 1 | Pigment dispersion liquid 4 | A | A | A | AA |
| | 5 | 1 | Pigment dispersion liquid 5 | A | A | A | AA |
| | 6 | 1 | Pigment dispersion liquid 6 | A | A | A | AA |
| | 7 | 1 | Pigment dispersion liquid 7 | A | A | A | AA |
| | 8 | 1 | Aqueous dye solution 1 | A | A | A | AA |
| | 9 | 1 | Aqueous dye solution 2 | A | A | A | AA |
| | 10 | 1 | — | A | A | A | AA |
| | 11 | 2 | Pigment dispersion liquid 1 | A | A | A | AA |
| | 12 | 3 | Pigment dispersion liquid 1 | A | A | A | AA |
| | 13 | 4 | Pigment dispersion liquid 1 | A | A | A | AA |
| | 14 | 5 | Pigment dispersion liquid 1 | A | A | A | AA |
| | 15 | 6 | Pigment dispersion liquid 1 | A | A | A | AA |

TABLE 3-continued

Composition and results of evaluation of the inks

| | Composition of the ink | | Evaluation results | | | |
|---|---|---|---|---|---|---|
| | Urethane resin number | Liquid containing coloring material | Highlighter resistance | Ejection stability | Ejection accuracy (initial) | Ejection accuracy (over time) |
| 16 | 7 | Pigment dispersion liquid 1 | A | A | A | AA |
| 17 | 8 | Pigment dispersion liquid 1 | A | A | A | AA |
| 18 | 9 | Pigment dispersion liquid 1 | A | A | A | AA |
| 19 | 10 | Pigment dispersion liquid 1 | A | A | B | A |
| 20 | 11 | Pigment dispersion liquid 1 | A | A | B | A |
| 21 | 12 | Pigment dispersion liquid 1 | A | A | A | A |
| 22 | 13 | Pigment dispersion liquid 1 | A | A | A | A |
| 23 | 14 | Pigment dispersion liquid 1 | A | A | A | AA |
| 24 | 15 | Pigment dispersion liquid 1 | A | A | A | AA |
| 25 | 16 | Pigment dispersion liquid 1 | B | A | A | AA |
| 26 | 17 | Pigment dispersion liquid 1 | B | A | A | AA |
| 27 | 18 | Pigment dispersion liquid 1 | A | A | A | A |
| 28 | 19 | Pigment dispersion liquid 1 | A | A | A | AA |
| 29 | 20 | Pigment dispersion liquid 1 | A | A | A | AA |
| 30 | 21 | Pigment dispersion liquid 1 | A | B | A | AA |
| 31 | 22 | Pigment dispersion liquid 1 | A | A | A | A |
| 32 | 23 | Pigment dispersion liquid 1 | A | A | A | A |
| 33 | 24 | Pigment dispersion liquid 1 | A | A | A | A |
| 34 | 25 | Pigment dispersion liquid 1 | A | A | A | A |
| 35 | 26 | Pigment dispersion liquid 1 | A | A | A | A |
| 36 | 27 | Pigment dispersion liquid 1 | A | B | A | AA |
| 37 | 28 | Pigment dispersion liquid 1 | A | B | A | AA |
| 38 | 29 | Pigment dispersion liquid 1 | A | B | B | B |
| 39 | 30 | Pigment dispersion liquid 1 | A | B | B | B |
| 40 | 31 | Pigment dispersion liquid 1 | A | B | B | B |
| 41 | 32 | Pigment dispersion liquid 1 | A | B | A | B |
| 42 | 33 | Pigment dispersion liquid 1 | A | B | A | B |
| 43 | 34 | Pigment dispersion liquid 1 | B | B | A | B |
| 44 | 35 | Pigment dispersion liquid 1 | B | B | A | A |
| 45 | 36 | Pigment dispersion liquid 1 | A | B | A | A |
| 46 | 37 | Pigment dispersion liquid 1 | A | B | A | A |
| 47 | 38 | Pigment dispersion liquid 1 | A | B | A | AA |

TABLE 4

Composition and results of evaluation of the inks

| | | Composition of the ink | | Evaluation results | | | |
|---|---|---|---|---|---|---|---|
| | | Urethane resin number | Liquid containing coloring-material | Highlighter resistance | Ejection stability | Ejection accuracy (initial) | Ejection accuracy (over time) |
| Comparative Example | 1 | 39 | Pigment dispersion liquid 1 | C | C | A | AA |
| | 2 | 40 | Pigment dispersion liquid 1 | C | C | A | AA |
| | 3 | 41 | Pigment dispersion liquid 1 | A | C | A | AA |
| | 4 | 42 | Pigment dispersion liquid 1 | C | A | A | AA |
| | 5 | 43 | Pigment dispersion liquid 1 | A | A | C | C |
| | 6 | 44 | Pigment dispersion liquid 1 | A | A | C | C |
| | 7 | 45 | Pigment dispersion liquid 1 | A | C | A | AA |
| | 8 | 46 | Pigment dispersion liquid 1 | A | A | A | C |
| | 9 | 47 | Pigment dispersion liquid 1 | A | C | A | AA |
| | 10 | 48 | Pigment dispersion liquid 1 | A | C | A | AA |
| | 11 | 49 | Pigment dispersion liquid 1 | A | A | A | C |
| | 12 | 50 | Pigment dispersion liquid 1 | A | C | A | AA |
| | 13 | 45 | Pigment dispersion liquid 1 | A | C | A | AA |
| | 14 | 46 | Pigment dispersion liquid 1 | A | A | A | C |
| | 15 | — | Pigment dispersion liquid 1 | C | A | B | B |
| | 16 | — | Pigment dispersion liquid 1 | C | A | B | B |

An aspect of the invention provides an ink that has excellent ejection stability, offers excellent ejection accuracy both initially and over time as a result of controlled irregular ejection, and allows the user to record an image having a high level of highlighter resistance. Some other aspects of the invention provide an ink cartridge and an ink jet recording method in which this ink is used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-252553 filed Dec. 5, 2013, which is hereby incorporated by reference herein in its entirety.

What is claimed is:

1. An aqueous ink for ink jet, comprising a urethane resin; wherein the urethane resin has a unit derived from a polyether polyol and a unit containing an acidic group, an acid value of the urethane resin is 40 mg KOH/g or more and 140 mg KOH/g or less,
a molar ratio of a proportion in % by mole of a urethane bond in the urethane resin to a proportion in % by mole of a urea bond is 80.0/20.0 or more, and
the acidic groups in the urethane resin are neutralized with an alkali metal ion and at least one ammonium type ion selected from ammonium ion and an organic ammonium ion, with a neutralization ratio of all acidic groups in the urethane resin being 80% or more and a neutralization ratio with the ammonium type ion being 1% or more and less than 45%.

2. The ink according to claim 1, further comprising a coloring material.

3. The ink according to claim 1, wherein the molar ratio of the proportion in % by mole of the urethane bond in the urethane resin to the proportion in % by mole of the urea bond is 85.0/15.0 or more.

4. The ink according to claim 1, wherein the molar ratio of the proportion in % by mole of the urethane bond in the urethane resin to the proportion in % by mole of the urea bond is 90.0/10.0 or more.

5. The ink according to claim 1, wherein the molar ratio of the proportion in % by mole of the urethane bond in the urethane resin to the proportion in % by mole of the urea bond is 98.5/1.5 or less.

6. The ink according to claim 1, wherein the neutralization ratio with the ammonium type ion is 2% or more and 40% or less.

7. The ink according to claim 1, wherein the ammonium type ion is $N^+H(CH_2CH_2OH)_3$.

8. The ink according to claim 1, wherein the alkali metal ion is potassium ion.

9. An ink cartridge, comprising an ink and an ink storage portion storing the ink;
the ink contains the ink according to claim 1.

10. An ink jet recording method, comprising ejecting ink from an ink jet recording head to record an image on a record medium;
the ink contains the ink according to claim 1.

11. The ink according to claim 1, wherein the alkali metal ion is potassium ion and the ammonium type ion is $N^+H(CH_2CH_2OH)_3$.

12. The ink according to claim 1, wherein an amount of the urethane resin is 0.1% by mass or more and 10.0% by mass or less based on a total mass of the ink.

13. The ink according to claim 2, wherein the coloring material comprises a pigment.

14. The ink according to claim 13, wherein the pigment is a self-dispersible pigment.

15. The ink according to claim 2, wherein an amount of the coloring material is 0.5% by mass or more and 10.0% by mass or less based on the total mass of the ink.

* * * * *